(12) United States Patent
Hayashi et al.

(10) Patent No.: US 6,373,509 B1
(45) Date of Patent: Apr. 16, 2002

(54) METHOD AND APPARATUS FOR INDICATING INFORMATION ON A CHART RECORDER

(75) Inventors: Hiroto Hayashi; Shouji Togashi; Keiichi Takano, all of Okegawa (JP)

(73) Assignee: Kokusai Chart Corporation, Okegawa (JP)

( * ) Notice: Subject to any disclaimer, the term of this patent is extended or adjusted under 35 U.S.C. 154(b) by 0 days.

(21) Appl. No.: 09/376,242

(22) Filed: Aug. 18, 1999

(30) Foreign Application Priority Data

Oct. 13, 1998 (JP) .......................................... 10-290274

(51) Int. Cl.[7] ........................... G01D 9/00; G01D 15/16
(52) U.S. Cl. .......................................... 346/17; 346/123
(58) Field of Search ......................... 346/17, 121, 123, 346/124, 139 C, 41, 68, 137, 25, 49

(56) References Cited

U.S. PATENT DOCUMENTS

| | | | | | |
|---|---|---|---|---|---|
| 1,850,078 A | * | 3/1932 | Johnson | ....................... | 346/17 |
| 4,333,084 A | * | 6/1982 | Peterson | ...................... | 346/17 |
| 5,019,838 A | * | 5/1991 | McKinley et al. | .......... | 346/121 |

* cited by examiner

*Primary Examiner*—John Barlow
*Assistant Examiner*—Juanita Stephens
(74) *Attorney, Agent, or Firm*—Moonray Kojima (57) ABSTRACT

A chart recorder apparatus wherein information is indicated by using light emitting devices which are disposed to access the rear surface of a chart on which measured signals of a chart recorder are recorded on a front surface thereof. Various types of information are projected and indicated without otherwise compromising features of a chart recorder and thereby enhancing functionality of a compact chart recorder having a small display area.

26 Claims, 9 Drawing Sheets

| | Input Signal | Measurement Range | Input Code |
|---|---|---|---|
| Thermocouple | K | −200〜1372°C | 0 |
| | J | −200〜1200°C | 1 |
| | T | −200〜 400°C | 2 |
| | R | 0〜1769°C | 3 |
| | S | 0〜1769°C | 4 |
| | B | 0〜1820°C | 5 |
| | E | −200〜1000°C | 6 |
| | N | 0〜1300°C | 7 |
| | PL II | 0〜1390°C | 8 |
| | W5Re/W26Re | 0〜2320°C | 9 |
| | U | 0〜 600°C | 10 |
| | L | 0〜 900°C | 11 |
| RTD | JPt100 | −200〜 510°C | 12 |
| | Pt100 | −200〜 660°C | 13 |
| VDC Low | mV | 0〜 10mV | 14 |
| | mV | 0〜 100mV | 15 |
| | mV | 0〜1000mV | 16 |
| VDC High | V | 0〜5V | 17 |
| | V | 1〜5V | 18 |

METHOD AND APPARATUS FOR INDICATING INFORMATION ON A CHART RECORDER

BACKGROUND OF THE INVENTION

1. Field of Invention

This invention relates to a method and apparatus for projecting information on a chart of a chart recorder; and more particularly, to an improvement thereof wherein the information is projected on to a rear surface of the chart and then read from the front surface thereof.

2. Description of the Prior Art

Chart recorders, such as those using circular charts, are widely used for recording and monitoring measurement data because of their economy, compactness and lightness of weight. Except for the chart paper itself, the front of the chart recorder is usually completely concealed by a cover. But, in point of fact, only a small part of the recorder front is actually covered since most of the front is taken up by the chart. Recently, microprocessor based digital technology has been incorporated into chart recorders, thereby enabling the chart recorders to handle a large amount and variety of information in addition to the recorded signals. Thus, it has become necessary to display on the chart of the recorder the foregoing information and other digital information necessary to configure various parameters for digital processing.

To equip the recorder with an additional digital display device however would use up added front surface space. Since the front surface area of the recorder is currently so limited on conventional recorders, adding any further display devices is not entirely feasible. Adding a separate information indicating mechanism would require an increase in the total front viewing area of the recorder and hence increase the total cost. This would detract from the utility of the chart recorders, which are widely used because of their economy, compactness and lightness of weight.

Moreover, adding such separate indicating mechanism would go counter to the current trend in technical development, wherein every effort is being made to reduce the size thereof and to increase the amount of information derivable from a smaller sized area. The display area of chart recorders used with the developing instrumentation systems is thus also becoming smaller and smaller while the information being displayed is increasing.

SUMMARY OF THE INVENTION

Accordingly, an object of the invention is to overcome the aforementioned and other deficiencies and disadvantages of the prior art.

The aforementioned and other objects are attained by the invention which encompasses a device for indicating information using light emitting devices disposed on the inside or back surface (the outside or front surface of the chart being the viewing surface) of a chart on which measurement signals are recorded on the front or viewing surface thereof. The light beams from the devices are transmitted from the back surface through the chart and appear on the front surface of the chart, thereby enabling various types of information to be indicated on the front surface of the chart.

Hence, advantageously, the invention enhances the functionality of a compact chart recorder having a small display area, by (1) projecting different types of information onto the rear surface of the chart on which measured information is recorded on a front surface thereof, (2) enabling the information to be read from the front surface of the chart after being transmitted from the rear surface and through the chart; and (3) enabling data values and parameters to be viewed and configured easily without sacrificing any of the other features of conventional chart recorders. In this manner while maintaining the advantages of conventional chart recorders, the invention also provides added data for viewing from the front of the chart without requiring added separate indicating devices.

BRIEF DESCRIPTION OF THE DRAWINGS

FIGS. 5($a$) and 5($b$) are schematic views depicting the information indicating devices of the embodiment of FIG. 1.

FIG. 8 is a flow chart depicting behaviour of the embodiment immediately after being turned ON.

DETAILED DESCRIPTION OF THE PREFERRED EMBODIMENTS

Figure 1:
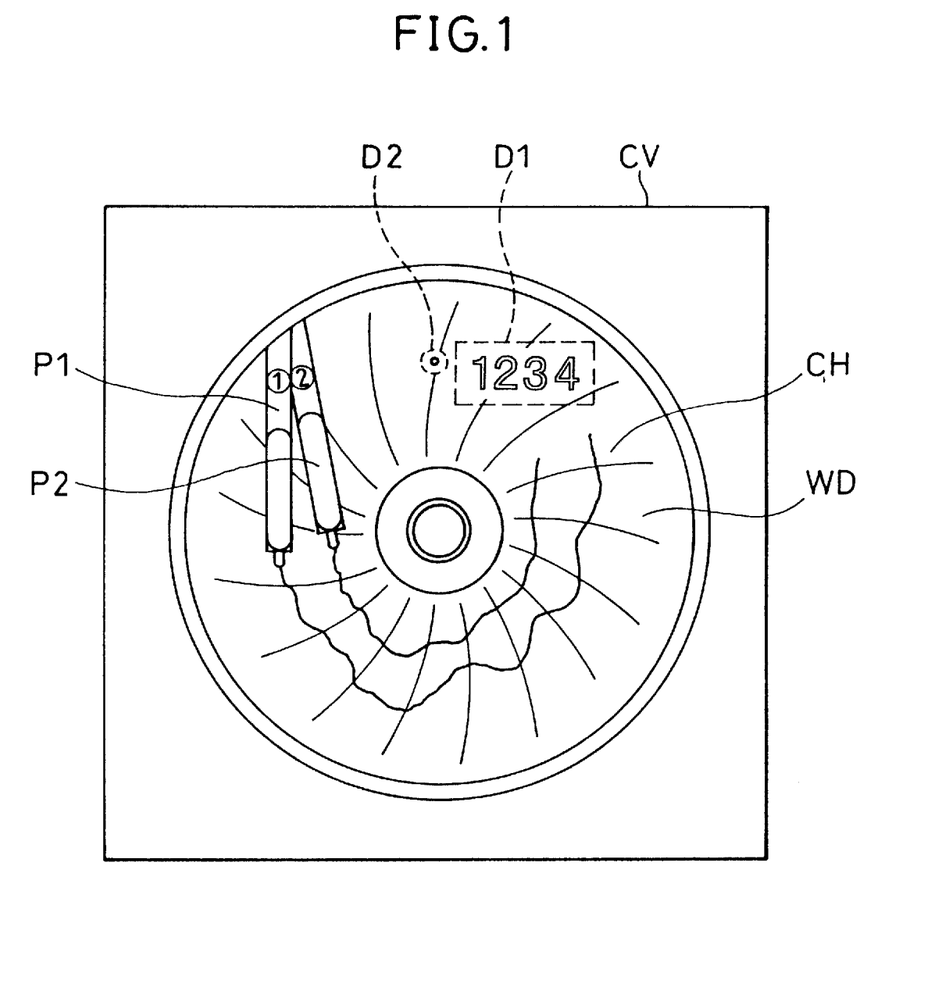
FIG. 1 is a schematic front view of an illustrative embodiment of the invention.
Figure 2:
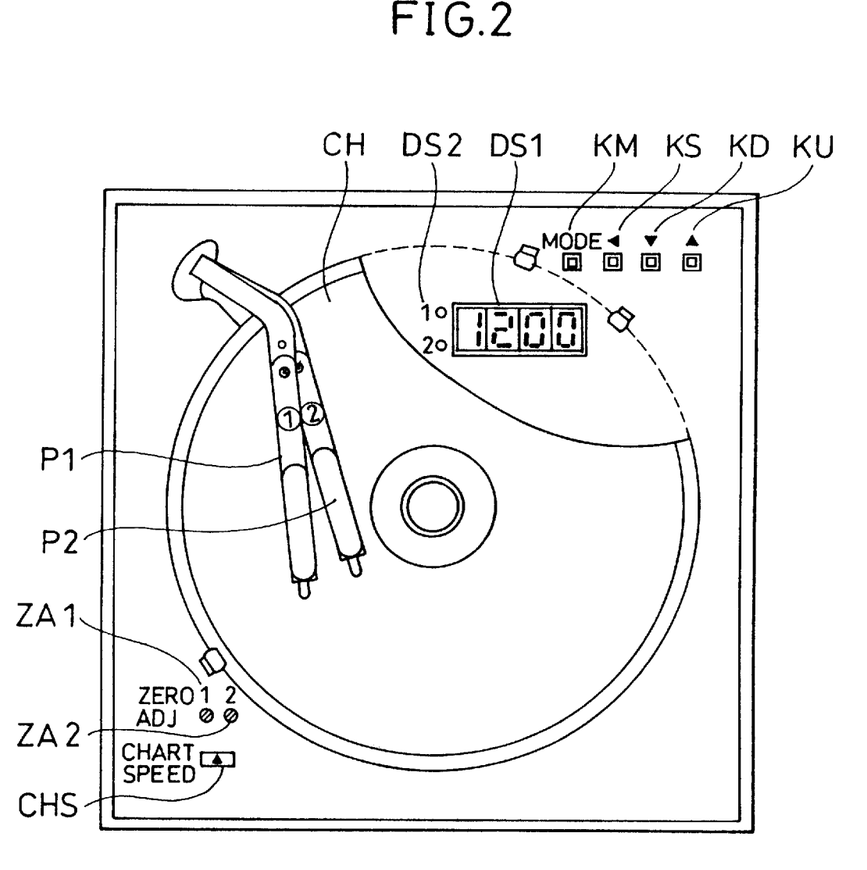
FIG. 2 is a schematic view depicting an open cover of a circular chart recorder of the embodiment of FIG. 1.
Figure 3:
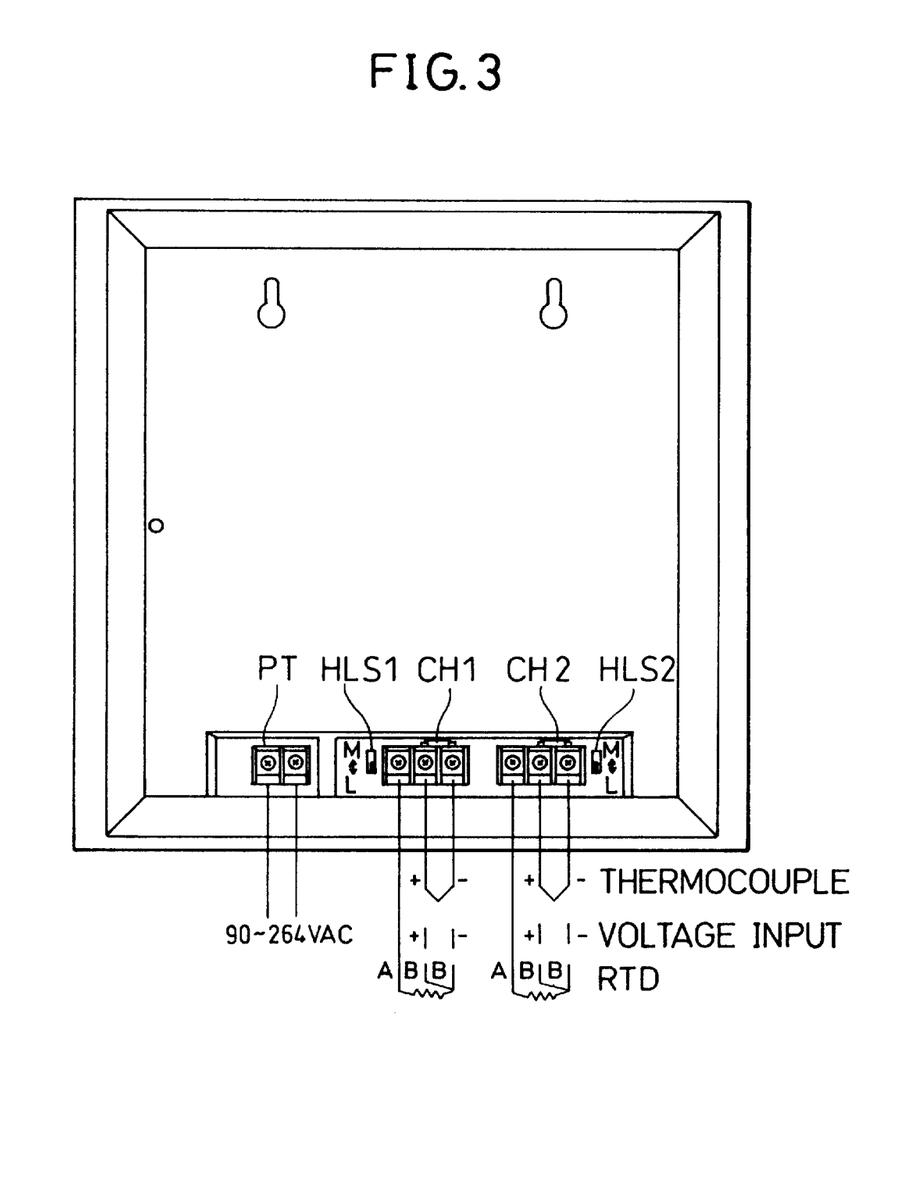
FIG. 3 is a schematic view depicting the back side of the embodiment of FIG. 1.

FIGS. 1,2 and 3 show a circular chart recorder used to carry out the method of the invention, wherein signals are recorded on the front or viewing surface of a circular chart CH, such as by use of recording pens P1 and P2. In this embodiment, a two channel circular chart recorder is shown using two recording pens P1 and P2. Different items of information D1 and D2 are indicated on chart CH. A cover CV is provided for the circular chart CH and a circular window WD is set on cover CV. Window WD is made preferably of a transparent glass or plastic and covers the circular chart CH.

In FIG. 2 setting keys KM, KS, KD and KU are used to set the type of input signal, input range, etc. The operations used to set the parameters are explained in detail hereinbelow. Volume controls ZA1 and ZA2 are provided for adjusting the zero points of the recording pens P1 and P2 and for the two channels. Provided is a chart speed selector switch CHS which controls the speed of the chart feeding.

In FIG. 3 a terminal block PT is connected to a commercial AC power supply of 90 to 264 V or a DC power supply of either 12 or 24 V. Another terminal block CH1 is provided for inputting channel 1 signals and termainl block CH1 is provided for inputting channel 2 signals. Both terminal blocks CH1 and CH2 have three terminals, two of which can be used for a thermocouple or voltage signal input, while all of which can be used for resistance temperature detector (called "RTD") input. In addition, the terminal blocks CH1 and CH2 each have selector switches HLS1 and HLS2, respectively, for selecting whether the level of signals applied are of a high level H or a low level L.

In the above embodiment, the circular chart CH is rotated at a constant speed selected by the chart speed selector switch CHS. The recording pens P1 and P2 are changed in their positions according to the magnitude of the signals applied to the signal input terminal blocks CH1 and CH2. Consequently, a change in the input signal with respect to time is recorded on the circular chart CH as two channel analog data. In such case, different colors may be assigned to the recording pens (e.g. red for pen P1 and blue for pen P2) for better readability of the recorded results.

FIG. 1 shows the usual view of the recording of the signals on the circular chart CH, as observed through the circular window WD fixed to the cover CV. D1 denotes an item of digital information, such as value of a measured signal or measurement range, indicated on the circular chart CH. D2 denotes an item of information that indicates to which of the two channels the value shown by the digital display DS1 in FIG. 2 applies. An indicator lamp corresponding to one of the input channels of the chart recorder is turned ON to indicate that the information currently displayed is from that input channel. The same color coding method, as discussed earlier, can be applied to this case by assigning different colors to each indicator lamp according to the colors of the recording pens P1 and P2, e.g. red for channel 1 and blue for channel 2. This enables the observer to instantly and intuitively recognize which channel applies to which data.

Information items D1 and D2 are indicated on the circular chart CH by projecting the information on to the rear surface of the chart CH using light emitting devices, such as an LED, so that the light is transmitted through the chart up to the recording (i.e. front) surface thereof. While the chart CH is rotated at a constant speed, changes in input signals with respect to time are recorded by the recording pens P1 and P2. The rotational position of the chart CH does not affect the transmission of information items D1 and D2 through the chart CH which are indicated in the window WD area at the particular position occupied by the chart. This means that even when input signals are being recorded on chart CH by recording pens P1 and P2, the recorder constantly indicates digital information and channel status corresponding to the analog record information recorded on chart CH by the recording pens. Consequently, it is possible to clearly distinguish the traces of the analog records from the digital information items D1 and D2, even when the traces overlie items D1 and D2.

Figure 4:
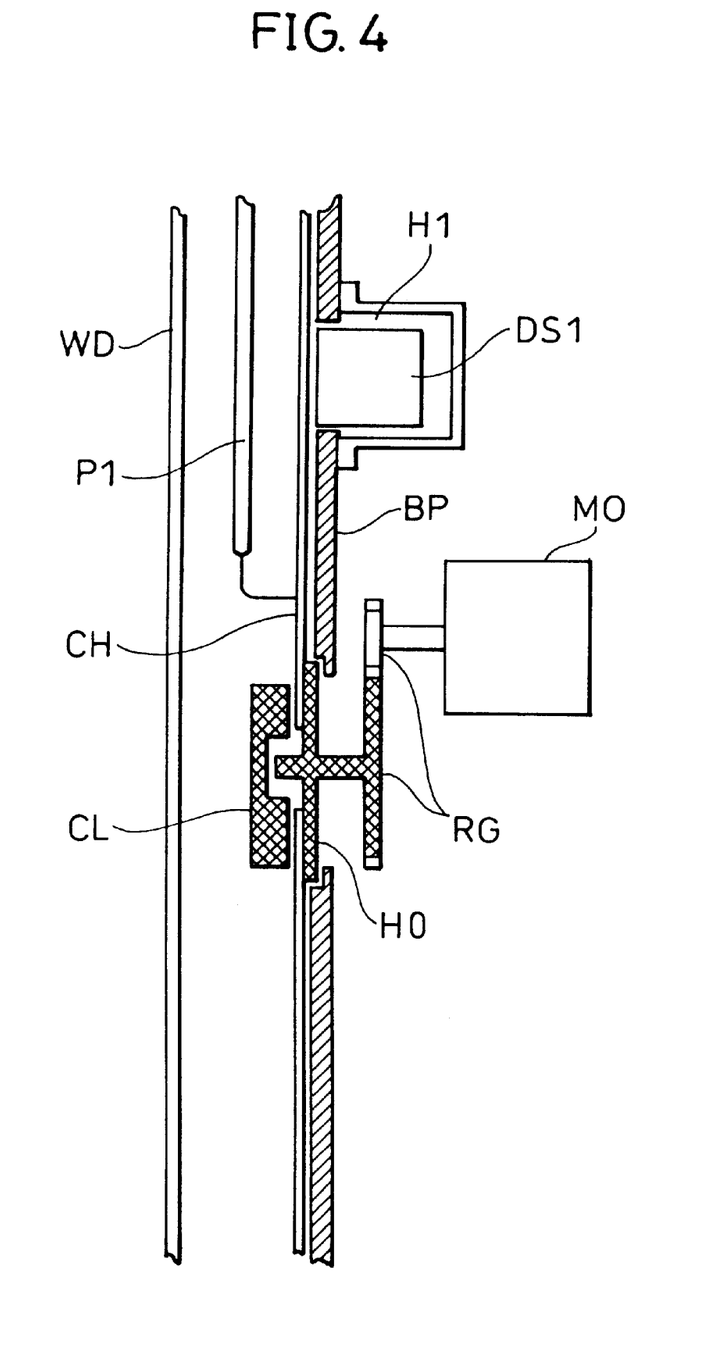
FIG. 4 is a cross sectional side view of the embodiment of FIG. 1.

FIG. 4 explains the specific format of the area on the circular chart used to display information, and shows the mechanical components of the chart recorder shown in FIG. 1 and the same components are denoted with the same reference symbols. Window WD is preferably of transparent glass or plastic set on the chart recorder to cover the circular chart CH whereon signals are recorded, such as with use of the recording pens P1,P2. In FIG. 4, for convenience, only one recording pen P1 is shown. The information indicating device DS1 projects information item D1 on to the back surface of the circular chart CH. In FIG. 4, because of the positioning of the devices DS1 and DS2, and the view being used, only device DS1 is shown. A backplate BP is disposed behind the circular chart CH. The chart CH is rotated by a chart driving motor MO via reduction gears RG and axle (not labeled). The chart CH is held by a mechanism CL in a locked position.

The backplate BP supports the circular chart CH from its back side. There are two openings in the backplate BP, first, an opening HO at the center of plate BP through which the chart driving axle (not labeled) is positioned and second, an opening H1 disposed toward the periphery through which pass the light beams from the information indicating device DS1. The backplate BP for the circular chart CH is fixed onto the chart recorder itself (by means not shown in FIG. 4). The axle, which is used from driving the chart CH, is connected to the reduction gear RG and is disposed through the opening HO of the backplate BP and protrudes from the front surface of the backplate so that the chart CH is fixed at the opening with use of locking mechanism CL. Chart CH is supported by the front surface of the backplate BP and is rotated at a constant speed according to the rotation of reduction gear RG as driven by motor MO.

While the chart CH is being rotated, the recording pen P1 may be changed in position according to the magnitude of the input signal applied thereto. This produces a trace of the positions of the recording pen P1 on chart CH, such that any change in the input signal over a period of time is recorded on the chart.

The information indicating device DS1, which preferably comprises a light emitting device, such as a light emitting diode (LED), is positioned in the opening H1 of the backplate BP from the rear thereof such that light beams from the device DS1 are projected directly onto the rear surface of chart CH through opening H1. The light beam is then transmitted through the chart CH from the rear surface thereof and appears on the front surface thereof. The intensity of the light beam is preferably sufficient to be able to be transmitted through the chart CH, and be recognizable from almost any angle and even in a bright environment due to the diffusion effect of the fibers contained in the chart CH.

Figure 5A:
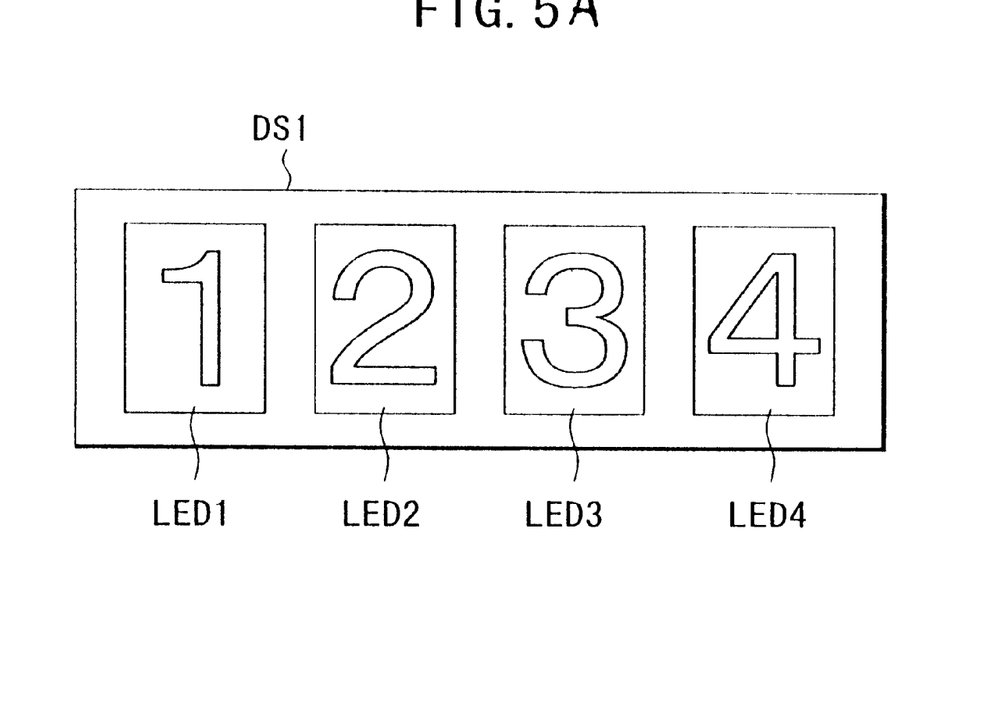
Figure 5B:
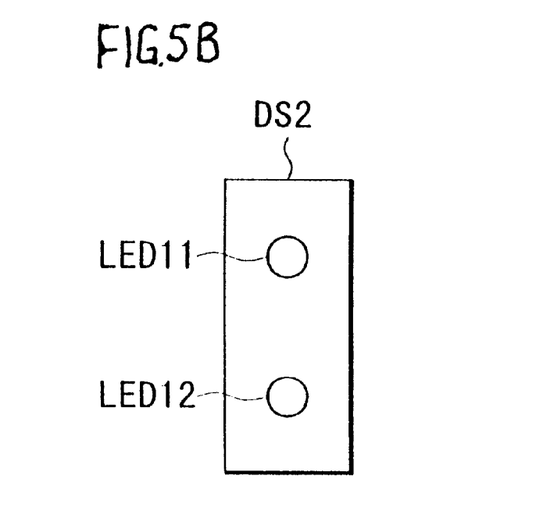

FIGS. 5(a) and 5(b) show the information indicating devices DS1 and DS2, respectively, wherein device DS1 displays in FIG. 5(a) the value of a 4 digit digital signal. LED 1, LED 2, LED 3 and LED 4 are digital display devices which use light emitting diodes, for example. Each of the digital display devices LED 1–LED 4 comprises more than one LED that are turned ON and emit light according to the value of the inputted signal. Each LED 1–LED 4 may indicate a number from 0 to 9, for example by being selectively turned ON according to the input signal. LED 1–LED 4 are positioned in series inside a case to form the information indicating device DS1, where a 4-digit value is displayed according to a digital signal applied to the device DS1. In FIG. 5(b), digital information indicating device DS2 indicates the channel status of an input signal wherein DS2 comprises LED 11 and LED 12, each of which uses light emittting diodes. LED 11 comprises an LED that is turned ON when channel 1 is selected. LED 12 comprises an LED that is turned on when channel 2 is selected. LED 11 and LED 12 are turned ON when the corresponding channel is selected for a given input signal to indicate which channel corresponds to the input signal whose value is shown by the device DS1. The LED 11 and LED 12 are positioned in series inside a case to form the information indicating device DS2.

Advantageously, by using devices DS1 and DS2, various types of information can be projected on to the rear surface of the chart CH which has measured signals recorded on a front surface thereof. The light from DS1 and DS2 are then transmitted from the rear surface through the chart CH and appear visually on the front surface of the chart CH, available for visual inspection by an operator. The indicating information provided by DS1 and DS2 on the front surface of chart CH serves at least two purposes, first, it provides means for configuring various parameters and second, it provides means for displaying the digital values of the input signals.

Figure 6:
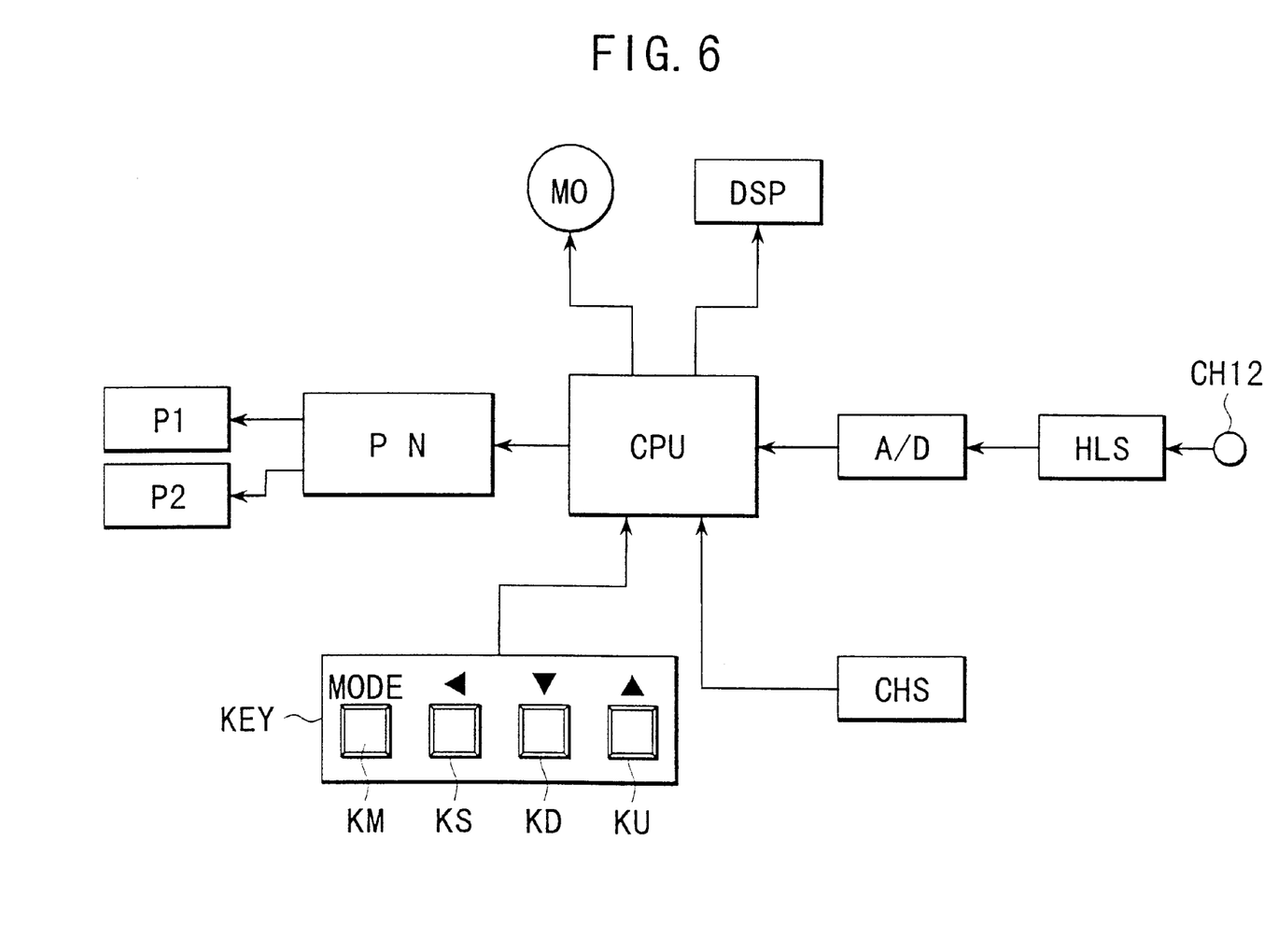
FIG. 6 is a block diagram depicting a microprocessor used in the invention.

FIG. 6 shows how a microprocessor and relevant components process the signals of the circular chart recorder of the invention, and controls the recorder. In FIG. 6, microprocessor CPU processes the signals appearing on the circular chart recorder and control the recorder. The CPU controls driver DSP which drives digital display devices DS1 and DS2 shown in FIG. 2. A keypad KEY comprises the setting keys KM, KS, KD and KU, shown in FIG. 2 and supplies the CPU with control signals. The CPU controls a driver PN which drives the recording pens P1 and P2, and a motor MO for driving the chart CH. A block CH12 provides recording signals to terminal blocks CH1 and CH2 shown in FIG. 3. A block HLS inputs signals selected by the High/Low level signal selector switches HLS1 and HLS2, shown in FIG. 3. An analog to digital converter A/D converts the analog signals from CH12 and HLS to digital signals and supplies the digital signals to the CPU. A switch CHS is provided for setting the feed rate for the chart CH shown in FIG. 2.

A signal inputted to block CH12, is adjusted by the selector switches HLS1 and HLS2 to a millivolt or volt level signal, and then is applied to block HLS. The output from the block HLS is applied to the A/D converter, converted to a digital signal, and then inputted to the microprocessor CPU. The CPU processes the digital signal obtained according to the signal inputted to block CH12, converts the processed signal to signal appropriate for the recording pens P1 and P2, and then feeds the signals to the driver PN so that the signals are recorded on chart CH by pens P1 and P2. In addition, the CPU drives motor MO at a speed set by the chart speed selector switch CHS.

The various set points and signals necessary to operate the chart recorder are inputted to the CPU using the key pad KEY. The state of the input from key KEY and the value of a signal are indicated by using the digital display device DS1. The functions and behavior of the setting keys KM, KS, KD and KU are as follows. KM is a MODE key. KS is a SHIFT key, KU is an UP key and KD is a DOWN key.

If the recorder is not in the setting mode, the MODE key is used to select the digital readings of channels 1 and 2, i.e. CH1 and CH2. If the recorder is in the setting mode, the MODE key is used to set the recording range and to write data into the memory unit of the recorder. If the recorder is not in the setting mode, the recorder can be changed to the setting mode for setting the recorder range by holding down the MODE key for at least two seconds. By holding down the MODE key again for at least two seconds, when the recorder is in the setting mode, the recorder can be changed to a state for selecting between digital readings for channels CH1 and CH2.

The SHIFT key KS works only when the recorder is in the setting mode. By pressing the SHIFT KEY the digits of the display device DS1 are cycled from right to left one digit at a time, making it easier to change the range. The UP and DOW keys KU and KD are used to add and subtract a value of 1 to and from a blinking digit when the recorder is in the setting mode. In addition, either the degree centigrade or degree fahrenheit (i.e. ° C. or ° F.) symbol can be selected by simultaneously holding down both the MODE and UP keys for at least three seconds when a temperature measuring sensor is selected.

Information items are supplied to the display device DS1 in the following manner. The chart recorder records inputted analog signals by means of the recording pens. However, since the recorder contains microprocessor CPU and a circuit capable of digital signal processing, the CPU first converts the analog signal to digital signals and then executes a variety of digital processing. For this purpose, a digital servo-mechanism is used in a servo control circuit to process the input signals digitally, thereby driving the recording pens using the digital information. This makes it easy to provide digital readings of the recorded signals.

Advantageously, the foregoing embodiment can readily accommodate various recorder parameters and readings and digital information obtained by processing analog signals. In order to configure and display the various parameters and readings, the desired items are selected from the digital information for viewing by the operator of the digitl display device DS1.

Figure 7:
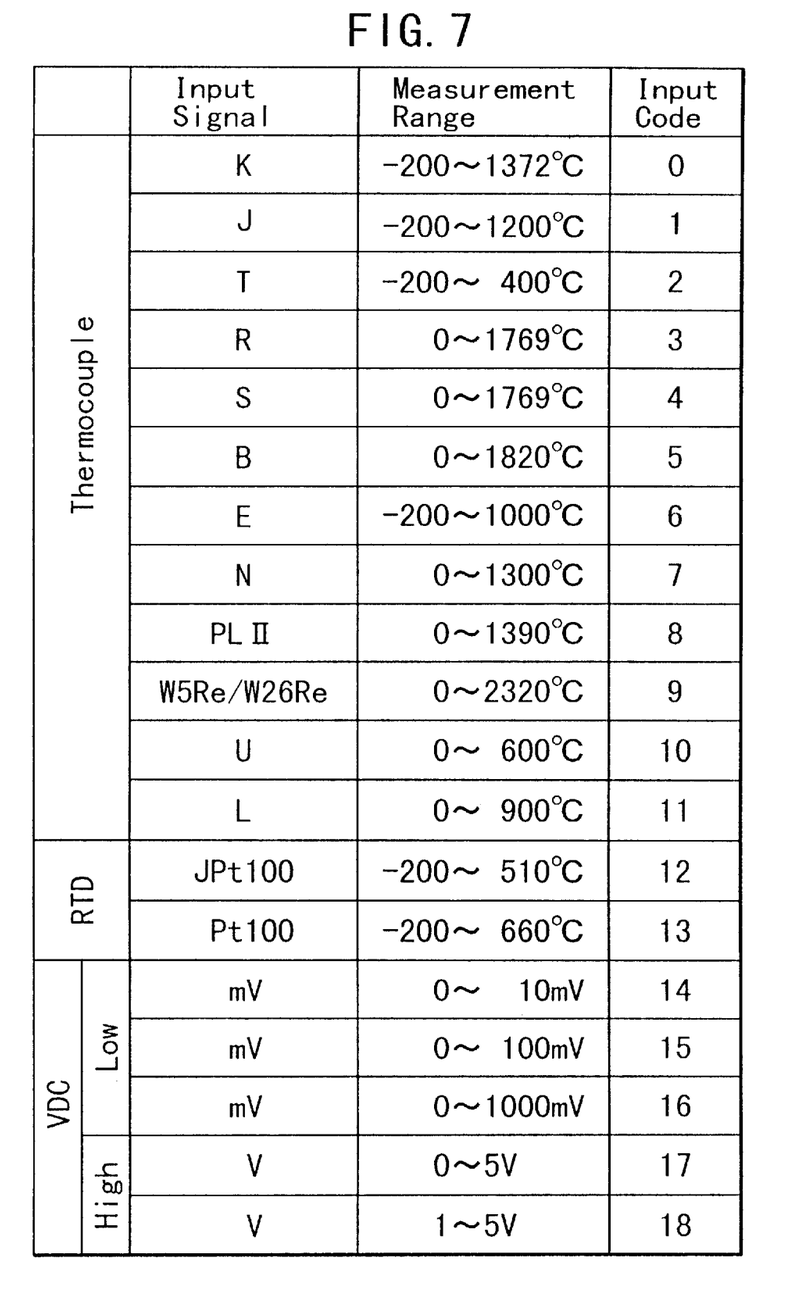
FIG. 7 is a table depicting types of input signals and measurement ranges of the embodiment of FIG. 1.

FIG. 7 summarizes examaples of types of input signals that the chart recorder can record and the measurement ranges of the recorder. As shown in FIG. 7, both channels CH1 and CH2 of the recorder can record a specific signal selected from a total of 19 types of thermocouple, RTD and DC voltage input signals. More specifically, each can measure:

(a) twelve types of signals selected from types K, J, T, R, . . . , U and L thermocouple inputs.

(b) two types of signals selected from JPt100 and Pt100 RTD inputs.

(c) five types of signals from DC voltage inputs, such as
   (1) three being in the low millivolt range, and
   (2) two being in the high volt range.

Each of the CH1 and CH2 signal input channels of the chart recorder has three terminals, as shown in FIG. 3. Two of the terminals can be used for a thermocouple input or voltage input. All of the terminals can be used for an RTD input. In addition, the CH1 and CH2 terminal blocks have selector switches HLS1 and HLS2 so that either the high level H or the low level L can be selected according to the high or low level of the DC voltage signal applied to each terminal block.

The type of signal to be applied to each of the CH1 and CH2 terminal blocks is specified using one of the input codes listed in FIG. 7. At this point, other parameters, such as the measurement range, are also set using the setting keys. Thus, the type of input signal is selected to determine which type of signal is recorded on which channel, and other such parameters as the input range are set using the four setting keys KM, KS, KD and KU on the key pad KEY and the digital display device DS1.

Figure 8:
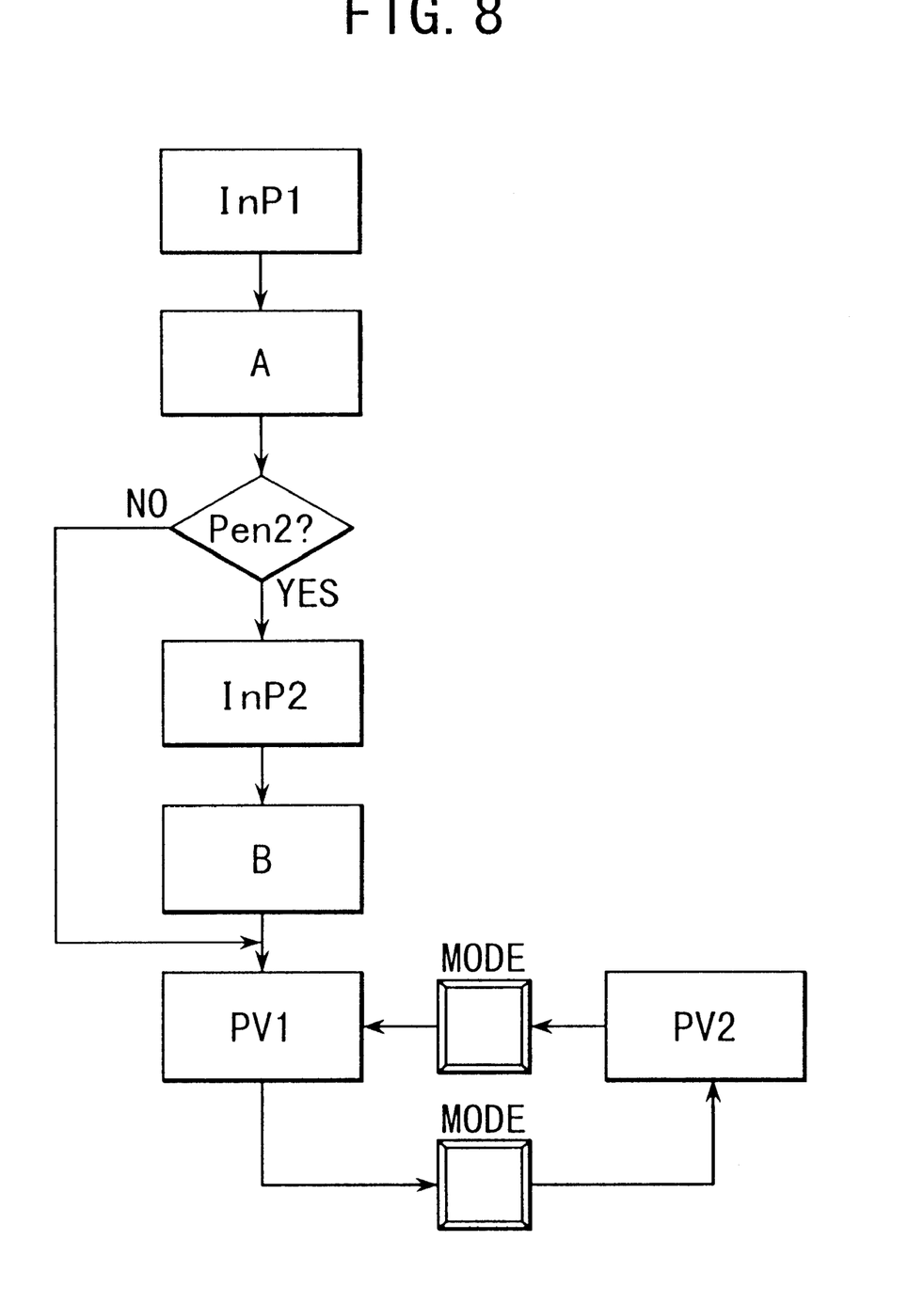
Figure 9:
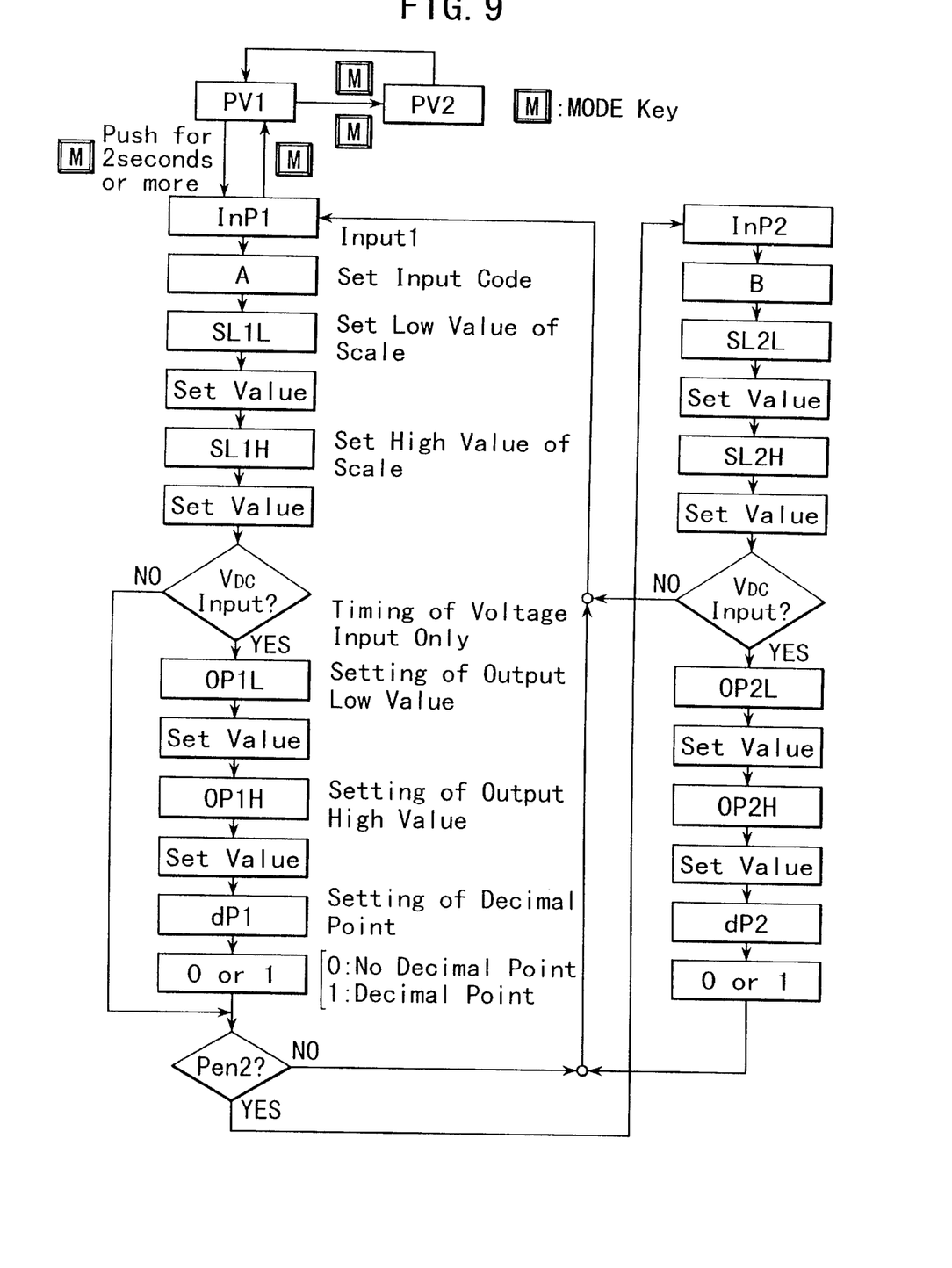
FIG. 9 is a flow chart depicting operations of the embodiment.

The flow charts of FIGS. 8 and 9 explain an example of how the various parameters are set using the setting keys KM, KS, KD and KU on the key pad KEY and the digital display device DS1. The flow chart of FIG. 8 shows the behavior of the chart recorder immediately after the recorder is turned ON. At that time, the recorder displays for approximately two seconds signal A (one of the two input codes listed in FIG. 7) which is set in the parameter for input signla 1 (InP1) to be applied to the recording pen P1, on the display device DS1. Then, the recorder shows on the display device DS1 for approximately two seconds the signal B (one of the input codes listed in FIG. 7) which is set in the parameter for input 2 (InP2) to be applied to the recording pen P2.

The recorder is shipped from the factory with the input code set to "0000", which indicates that the recorder is initially set for a type K thermocouple input. If a type K thermocouple is connected to an input terminal block, the temperature sensed by the thermocouple at the moment can be readily indicated on the display device DS1. Thus, the recorder first displays on the display device DS1 the input codes set in InP1 and Inp2 parameters and then displays a process variable PV1 for input 1 (InP1).

A process variable PV2 for input 2 (InP2) can be indicated by pressing the MODE key KM to change the reading of the display device DS1 from the input 1 process variable PV1 to the input 2 process variable PV2. The reading of the display device DS1 can be changed back to the input 1 process variable PV1 from the input 2 process variable PV2 by pressing the MODE key KM once more.

If the input codes or any other parameters set for the inputs InP1 and InP2 are different from those of the desired sensors, then, the inputs are reset.

The flow chart of FIG. 9 explains the operation for setting the type of input signal to be recorded on the recorder chart and the measurement range and the read out scale range. As an example of configuring the recorder, the following explains the case of when a Pt100 RTD is connected to input 1 and the scale range is set as 0° C. to 100° C. To start with, the parameter InP1 is read on to the display device DS1 by pressing the MODE key KM for at least two seconds. This facilitates the setting fo the input code and measurement range. After the parameter InP1 has appeared, the MODE key is pressed again to select the type of input signal. According to the list of input signal codes in FIG. 7, Pt100 is defined as the input code 0013.

The least significant digit of the display device DS1 is selected using the SHIFT key KS and its value is changed to 3 using the UP key KU. Then, the second least significant digit is selected using the SHIFT key to change its value to 1. Consequently, the indication A of the display device is "0013", and hence the selection of code 0013 (Pt100) in FIG. 7 is completed.

The range of temperature that can be measured at this point has previously been set to −200° C. to 660° C. If desired a scale range can be set in order to specify over which range of the total measurement range, the recorder can record the temperature. The temperature can for example be set to 0° C. to 100° C. in the following manner. To start with, the lower limit SLL of the scale is set to 0000 using the SHIFT key KS and the UP key KU. Then, the upper limit SL1H of the scale is set to 0100 using the SHIFT key KS and UP key KU. These steps complete the setting of the temperature range for input 1.

If the type of signal for input 2 and its scale range is to be set, the input 2 parameter InP2 is read onto the display device DS1 using the MODE key KM and then configured in the same way as the input 1 parameter InP1.

As a second example of how to configure the recorder, the following explains the case where the 0 volt DC (0–1050 hPa) output voltage signal of an absolute pressure sensor is connected to input 2 and the scale range thereof is set to 950 to 1050 hPa. In the case of DC voltage input, the range can be set to a millivolt level with input codes 14 to 16 or to a voltage level with input codes 17 and 18. When the 0–5 volt range having the input code 17 or the high 1–5 volt range having the input code 18, is applied, the H/L level selector switch next to the input terminal block shown in FIG. 3 is placed in the H position in order to set the input voltage level.

To start with, the 0–1000 mV DC input signal range having the input code 16 is selected. Then, the read out scale corresponding to the input range is defined. To do so, the lower limit SL2L and the upper limit SL2H of the input signal range are set to 0000 and 1050 respectively.

Next, the limits of a scale range over which the recorder should actually record data are set using the parameters OP2L and OP2H. More specifically, the setting is completed by setting OP2L to 0950 and OP2H to 1050. If one of the voltage inputs having input codes 14 to 18 is selected, it is possible to place a decimal point in the digital readings of the display device DS1, as represented by the 000.0–100.0% range. To do this, the MODE key KM is pressed repeatedly until it shows the parameter dP1 or dP2 and the parameter is set to 0001.

The indication of an over-range state is achieved as follows: If a process variable exceeds the upper limit of a preset read out scale range the dispaly device DS1 blinks while still indicating its current digital value. If the process variable exceeds the upper limit to a greater extent and goes beyond the upper limit of the set up scale range, the display device shows HHHH. Alternatively, if the process variable falls below the lower limit of the set up scale range, the display device shows LLLL. Thus, the record informs the operator that the process variable has disobeyed the upper limit or lower limit of the set up scale range.

Various types of information are projected on to the recording surface of the chart after transmission through the chart from the rear surface thereof using the light emitting diodes of the display device DS1. This information can be used to set up and display various set up parameters and read out data on the recorder without having to add a separate display device and otherwise take up more area on the recorder in addition to the area taken up by the chart. Thus the invention advantageously realizes the same functionality of a large scale recorder equipped with a separate dedicated display device without changing the structure the conventional recorder, and without adding another separate dedicated display device.

Advantageously, in the invention, the chart recorder has a small display area and hence has the characteristics of compactness, economy and lightness of weight.

Advantageously, by projecting indicating information onto the rear surface of the chart, the invention provides desired information on the viewing surface of the chart without significantly increasing cost or providing a separate display device. Thus, the invention takes a conventional recorder and significantly increases its functionality without any significant increase in cost or increase in viewing surface area. Accordingly the invention provides advantageously, increased information without increasing the display area.

The foregoing description is illustrative of the principles of the invention. Numerous extensions and modifications thereof would be apparent to the worker skilled in the art. All such extensions and modifications are to be considered to be without the spirit and scope of the invention.

What is claimed is:

1. A method of indicating information on a chart recorder comprising the steps of:
   recording measured signals on a front surface of a chart;
   projecting information on to a rear surface of said chart using a light beam; and
   displaying said information and said measured signals on said front surface of said chart, wherein said information is transmitted from said rear surface through said chart and appears on said front surface.

2. The method of claim 1, wherein said chart is of circular configuration.

3. A method of indicating information on a chart on which measured signals are recorded, said method comprising the steps of:
   projecting information onto a rear surface of said chart using a light emitting device; and
   displaying said information on a front surface of said chart,
   wherein said information is transmitted from said rear surface through said chart and appearing on said front surface.

4. The method of claim 3, wherein said chart is of circular configuration.

5. A method of indicating information on a chart recorder comprising the steps of:
projecting on to a rear surface of a chart of said chart recorder digital information and of a channel for the digital information using a light emitting device; and
displaying the digital information and channel thereof on a front surface of said chart.

6. The method of claim 5, wherein said chart is of circular configuration.

7. An information indicating apparatus comprising:
indicating means for providing information using at least one light emitting means mounted to access a back surface of a chart on which measured signals are recorded on a front surface;
means for transmitting beams from said light emitting means through said chart; and
means for displaying said front surface of said chart to obtain said information.

8. The apparatus of claim 7, wherein said chart is of circular configuration.

9. The apparatus of claim 8, wherein said light emitting means comprises light emitting diodes.

10. The apparatus of claim 7, wherein said light emitting means comprises light emitting diodes.

11. An information indicating apparatus comprising:
indication means for providing digital information using light emitting means mounted to access a back surface of a chart on which measured signals are recorded;
means for transmitting beams from said light emitting means through said chart;
means for displaying said digital information on a front surface of said chart to obtain said digital information; and
means for utilizing said digital information to set and display parameters and measured data.

12. The apparatus of claim 11, wherein said chart is of circular configuration.

13. The apparatus of claim 12, wherein said light emitting means comprises light emitting diodes.

14. The apparatus of claim 11, wherein said light emitting means comprises light emitting diodes.

15. An information indicating apparatus for use with a chart recorder comprising:
digital indication means for providing information using light emitting means mounted adjacent a back surface of a chart on which measured signals are recorded on a front surface thereof;
retention means for retaining signal processing data for signal inputs, said inputs comprising signals from a thermocouple, RTD, and DC voltages;
signal selection means for selecting a specific signal according to digital information indicated by said digital indication means; and
means for utilizing indications provided by said digital indication means to set and display parameters and measured data.

16. The apparatus of claim 15, wherein said chart is of circular configuration.

17. The apparatus of claim 16, wherein said light emitting means comprises light emitting diodes.

18. The apparatus of claim 15, wherein said light emitting means comprises light emitting diodes.

19. An information indicating apparatus for use with a chart recorder comprising:
digital indication means for providing information using light emitting means mounted to access a back surface of a chart on which measured signals are recorded on a front surface thereof;
retention means for retaining signal processing data for signal inputs, said inputs comprising thermocouple, RTD, and DC voltages;
signal selection means for selecting a specific signal from signal retained by said retention means according to digital information indicated by said digital indication means;
selection means for setting maximum and minimum scale values whereby said maximum and minimum scale values for an input signal recorded on said chart are specified according to digital information indicated by said digital indication means; and
means for utilizing indications provided by said digital indication means to set and display parameters and measured data.

20. The apparatus of claim 19, wherein said chart is of circular configuration.

21. The apparatus of claim 20, wherein said light emitting means comprises light emitting diodes.

22. The apparatus of claim 19, wherein said light emitting means comprises light emitting diodes.

23. An information indicating apparatus for use with a chart recorder, comprising:
indication means for providing information using light emitting means mounted near a back surface of a chart on which measured signals are recorded on a front surface thereof;
means for providing said light emitting means with digital information of recorded signals and channel for said digital information;
means for causing said light emitting means to project said information on said back surface of said chart so that light beams from said light emitting means are transmitted through said chart to thereby appear on said front surface of said chart to show said information and said channel.

24. The apparatus of claim 23, wherein said chart is of circular configuration.

25. The apparatus of claim 24, wherein said light emitting means comprises light emitting diodes.

26. The apparatus of claim 23, wherein said light emitting means comprises light emitting diodes.

* * * * *